United States Patent [19]
Goldberg

[11] Patent Number: 6,061,574
[45] Date of Patent: May 9, 2000

[54] METHOD AND APPARATUS IN A WIRELESS COMMUNICATION SYSTEM FOR REDUCING ERRORS CAUSED BY INTERSYMBOL INTERFERENCE DURING A SIMULCAST TRANSMISSION

[75] Inventor: Steven Jeffrey Goldberg, Fort Worth, Tex.

[73] Assignee: Motorola, Inc., Schaumburg, Ill.

[21] Appl. No.: 09/079,535

[22] Filed: May 15, 1998

Related U.S. Application Data

[63] Continuation-in-part of application No. 08/959,409, Oct. 28, 1997.

[51] Int. Cl.[7] .................................................. H04B 7/005
[52] U.S. Cl. ........................ 455/503; 455/67.6; 375/348
[58] Field of Search .................................. 455/31.1, 31.2, 455/31.3, 38.1, 59, 503, 67.6; 375/348, 296, 285, 290, 291

[56] References Cited

U.S. PATENT DOCUMENTS

| 5,335,357 | 8/1994 | Fennell et al. ........................... 455/503 |
| 5,361,398 | 11/1994 | Christian et al. ....................... 455/503 |
| 5,515,365 | 5/1996 | Sumner et al. .......................... 375/296 |
| 5,535,215 | 7/1996 | Hieatt, III ............................... 455/503 |
| 5,541,953 | 7/1996 | Hiben et al. ............................ 375/295 |
| 5,835,536 | 11/1998 | May et al. ............................... 375/316 |

*Primary Examiner*—Reinhard J. Eisenzopf
*Assistant Examiner*—Darnell R. Armstrong
*Attorney, Agent, or Firm*—R. Louis Breeden

[57] ABSTRACT

A controller (112) controls (706) at least two transmitters (302) to transmit at least two simulcast signals (502, 504) during a time period. The at least two simulcast signals produce intersymbol interference at a receiver. At least one of the transmitters changes (708) its output amplitude during a portion of the time period, thereby altering the intersymbol interference during the portion of the time period.

18 Claims, 3 Drawing Sheets

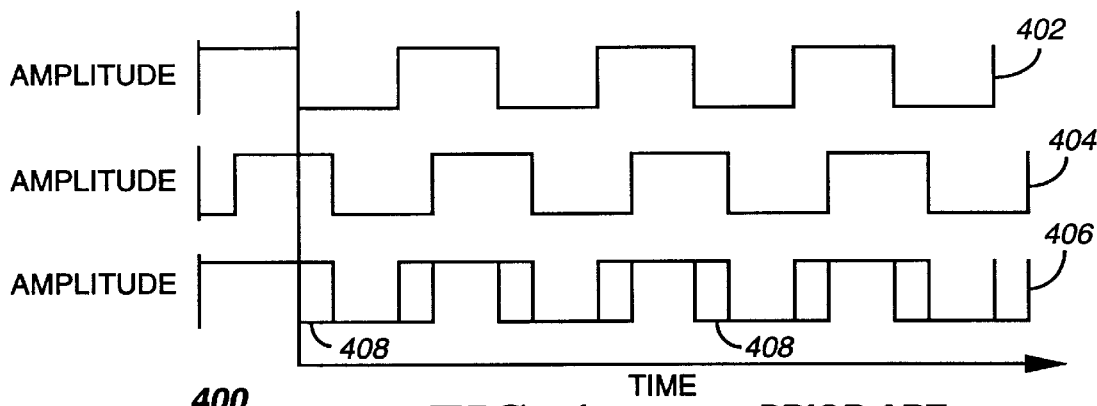
FIG. 4 *PRIOR ART*
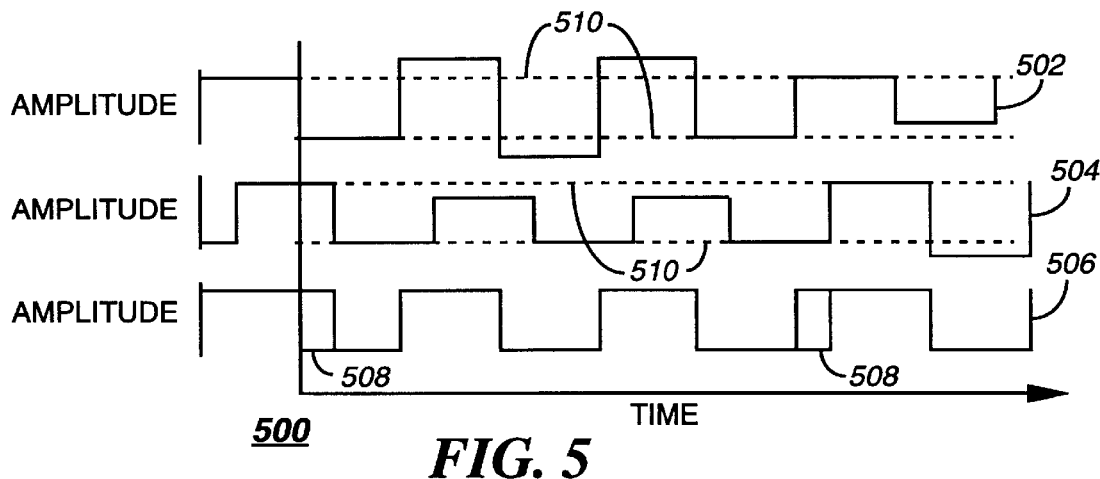
FIG. 5
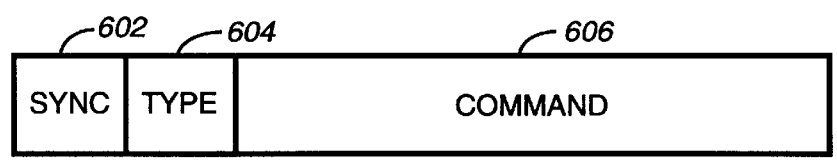
FIG. 6
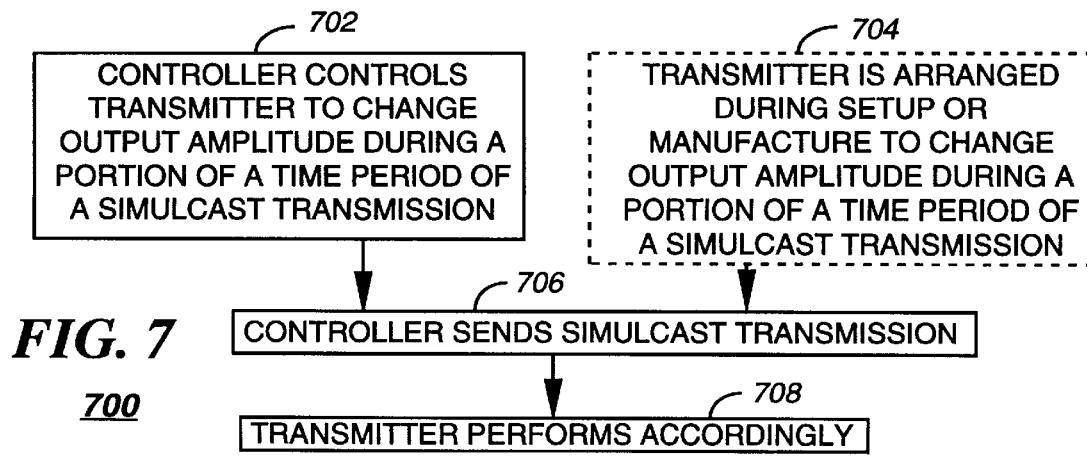
FIG. 7

METHOD AND APPARATUS IN A WIRELESS COMMUNICATION SYSTEM FOR REDUCING ERRORS CAUSED BY INTERSYMBOL INTERFERENCE DURING A SIMULCAST TRANSMISSION

This application is a continuation-in-part of application Ser. No. 08/959,409, filed Oct. 28, 1997 by Goldberg et al., entitled "METHOD AND APPARATUS IN A MESSAGING SYSTEM FOR LIMITING AN INTERVAL OF CARRIER CANCELLATION." Said application is hereby incorporated herein by reference.

FIELD OF THE INVENTION

This invention relates in general to wireless communication systems, and more specifically to a method and apparatus in a wireless communication system for reducing errors caused by intersymbol interference during a simulcast transmission.

BACKGROUND OF THE INVENTION

Simulcast transmission has been employed for years in selective call messaging systems for providing enhanced reliability and improved coverage. Simulcast transmission is accomplished by simultaneously transmitting the same identical signal from two or more geographically separated transmitters. The resultant space diversity is primarily what produces the enhanced reliability and improved coverage.

Good simulcast transmission has always required some form of delay equalization or launch time synchronization to ensure that the transmissions from different transmitters begin at the same time. For low speed data, having the transmissions begin at the same time has usually been sufficient. For the high speed data which is becoming more prevalent today, having the transmissions begin at the same time is necessary, but not sufficient. The reason is that differential transmission delay introduced in the air links can become a significant fraction of the symbol period when the symbol rate is high. When differential transmission delay becomes a significant fraction of the symbol period, intersymbol interference can occur when two or more simulcast signals arrive at the receiver with similar amplitudes. Such intersymbol interference can cause a high error rate in the received signal.

Thus, what is needed is a method and apparatus that can reduce errors caused by intersymbol interference during a simulcast transmission when two or more simulcast signals are received at similar amplitudes with different transmission delays. The method and apparatus preferably will operate without requiring a custom tuning adjustment during installation and system setup.

SUMMARY OF THE INVENTION

An aspect of the present invention is a method in a wireless communication system for reducing errors caused by intersymbol interference in at least two simulcast signals transmitted during a time period. The at least two simulcast signals are received at similar amplitudes and have different transmission delays with respect to one another. The method comprises the steps of transmitting the at least two simulcast signals from a corresponding at least two transmitters, and changing an output amplitude of at least one of the at least two transmitters during a portion of the time period, thereby altering the intersymbol interference during the portion of the time period.

Another aspect of the present invention is a transmitter in a wireless communication system for reducing errors caused by intersymbol interference in at least two simulcast signals transmitted during a time period. The at least two simulcast signals are received by a receiver at similar amplitudes and have different transmission delays with respect to one another. The transmitter comprises a transmitter element for transmitting a first simulcast signal sent simultaneously with at least a second simulcast signal from another transmitter, and a modulator coupled to the transmitter element for changing an output amplitude of the transmitter during a portion of the time period, thereby altering the intersymbol interference at the receiver during the portion of the time period.

Another aspect of the present invention is a controller in a wireless communication system for reducing errors caused by intersymbol interference in at least two simulcast signals transmitted during a time period. The at least two simulcast signals are received at similar amplitudes and have different transmission delays with respect to one another. The controller comprises a network interface for receiving a message from a message originator, and a processing system coupled to the network interface for processing the message. The controller further comprises a base station interface coupled to the processing system for controlling a transmitter to transmit one of the at least two simulcast signals. The processing system is programmed to control the transmitter to change an output amplitude of the transmitter during a portion of the time period, thereby altering the intersymbol interference during the portion of the time period.

BRIEF DESCRIPTION OF THE DRAWINGS

FIG. 4 is a timing diagram depicting intersymbol interference in a prior art wireless communication system.

FIG. 5 is a timing diagram depicting reduced intersymbol interference in the wireless communication system in accordance with the present invention.

FIG. 6 is an exemplary protocol diagram in accordance with the present invention.

FIG. 7 is a flow diagram depicting operation of the exemplary wireless communication system in accordance with the present invention.

DETAILED DESCRIPTION OF THE DRAWINGS

Figure 1:
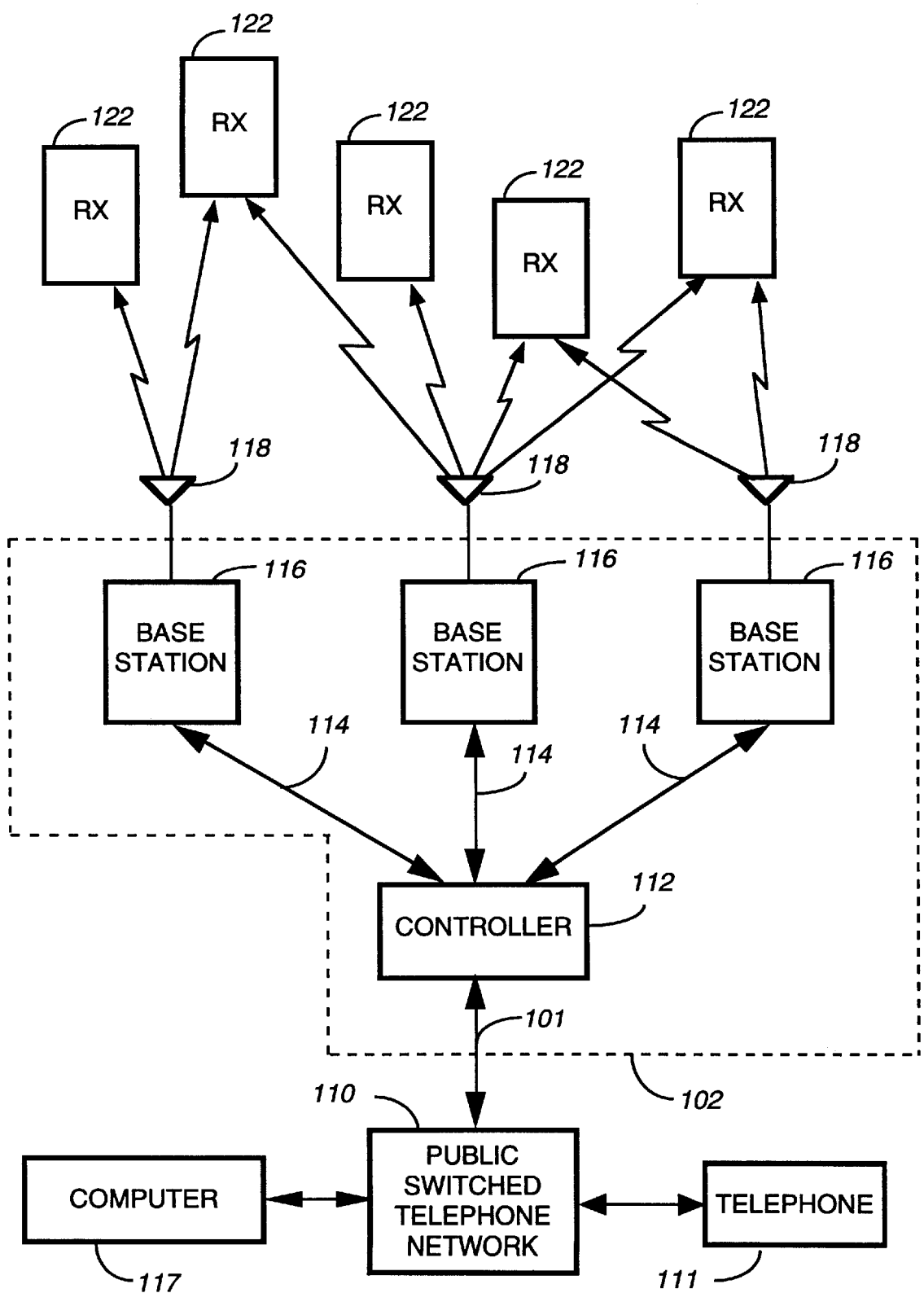
FIG. 1 is an electrical block diagram of an exemplary wireless communication system in accordance with the present invention.

FIG. 1 is an electrical block diagram of an exemplary wireless communication system in accordance with the present invention, comprising a fixed portion 102 including a controller 112 and a plurality of base stations 116, the wireless communication system also including a plurality of receivers 122. The base stations 116 preferably communicate with the receivers 122 utilizing conventional radio frequency (RF) signals for sending simulcast transmissions in accordance with the present invention, as will be explained further below. The base stations 116 are coupled by communication links 114 to the controller 112, which controls the base stations 116.

The hardware of the controller 112 is preferably a combination of the Wireless Messaging Gateway (WMG™)

Administrator! paging terminal, and the RF-Conductor!™ message distributor manufactured by Motorola, Inc., and includes software modified in accordance with the present invention. The base stations 116 comprise a transmitter preferably similar to the RF-Orchestra! transmitter, modified in accordance with the present invention, and can include, in two-way wireless communication systems, the RF-Audience!™ receiver manufactured by Motorola, Inc. The receivers 122 are preferably similar to the Advisor Gold™ and Pagefinder™ wireless communication units, also manufactured by Motorola, Inc. It will be appreciated that other similar hardware can be utilized as well for the controller 112, the base stations 116, and the receivers 122.

Each of the base stations 116 transmits RF signals to the receivers 122 via an antenna 118. The RF signals transmitted by the base stations 116 to the receivers 122 (outbound messages) comprise selective call addresses identifying the receivers 122, and voice and data messages originated by a caller, as well as commands originated by the controller 112 for adjusting operating parameters of the radio communication system.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 117 coupled to the PSTN 110. It will be appreciated that, alternatively, other types of communication networks, e.g., packet switched networks, the Internet, and local area networks, can be utilized as well for transporting originated messages to the controller 112.

The over-the-air protocol utilized for the transmissions is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will be further appreciated that, while one embodiment for practicing the present invention is a one-way wireless communication system, the present invention is applicable also to a two-way wireless communication system.

Figure 2:
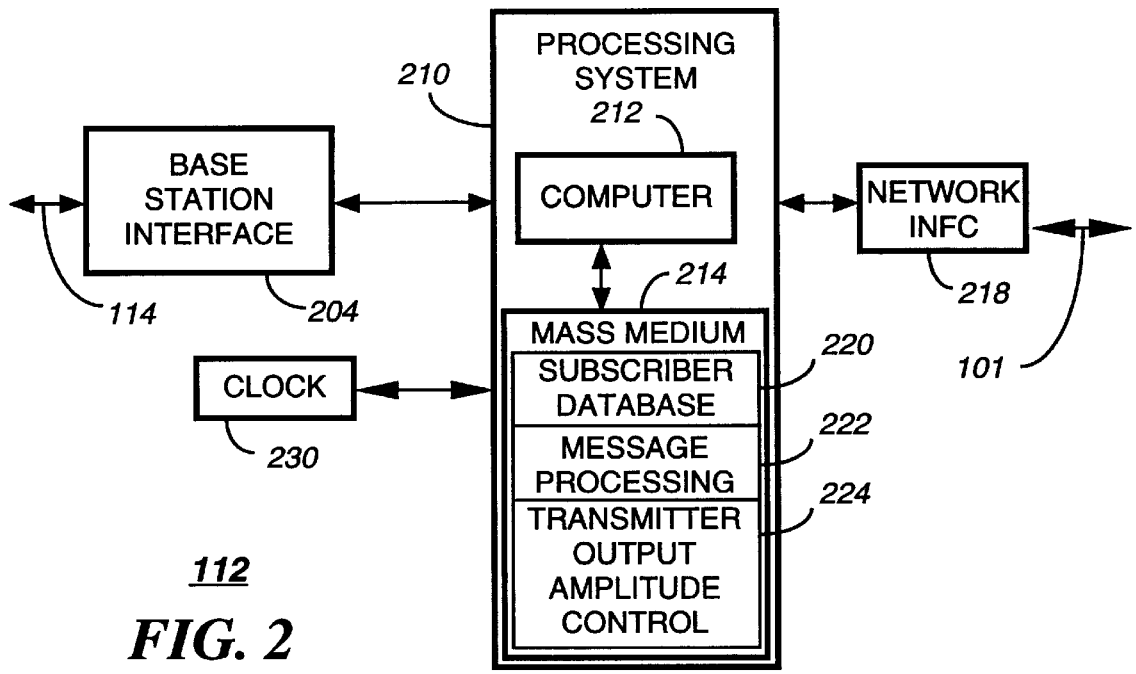
FIG. 2 is an electrical block diagram of an exemplary controller in accordance with the present invention.

FIG. 2 is an electrical block diagram depicting an exemplary controller 112 in accordance with the present invention. The controller 112 comprises a network interface 218 for receiving a message from a message originator via the telephone links 101. The network interface 218 is coupled to a processing system 210 for controlling and communicating with the network interface 218. The processing system is coupled to a base station interface 204 for controlling and communicating with the base stations 116 via the communication links 114. The processing system 210 is also coupled to a conventional clock 230 for providing a timing signal to the processing system 210. The processing system 210 comprises a conventional computer 212 and a conventional mass medium 214, e.g., a magnetic disk drive, programmed with information and operating software in accordance with the present invention. The mass medium 214 comprises a subscriber database 220, including information about the receivers 122 controlled by the controller 112. The mass medium 214 also includes a message processing element 222 for programming the processing system 210 to process messages for the receivers 122 in a conventional manner. In accordance with the present invention, the mass medium 214 also includes a transmitter output amplitude control element 224 for programming the processing system to control the transmitter 302 (FIG. 3) of the base stations 116 to change an output amplitude of the transmitter 302 during a portion of a time period during which simulcast transmissions are sent, thereby altering the intersymbol interference during the portion of the time period.

Figure 3:
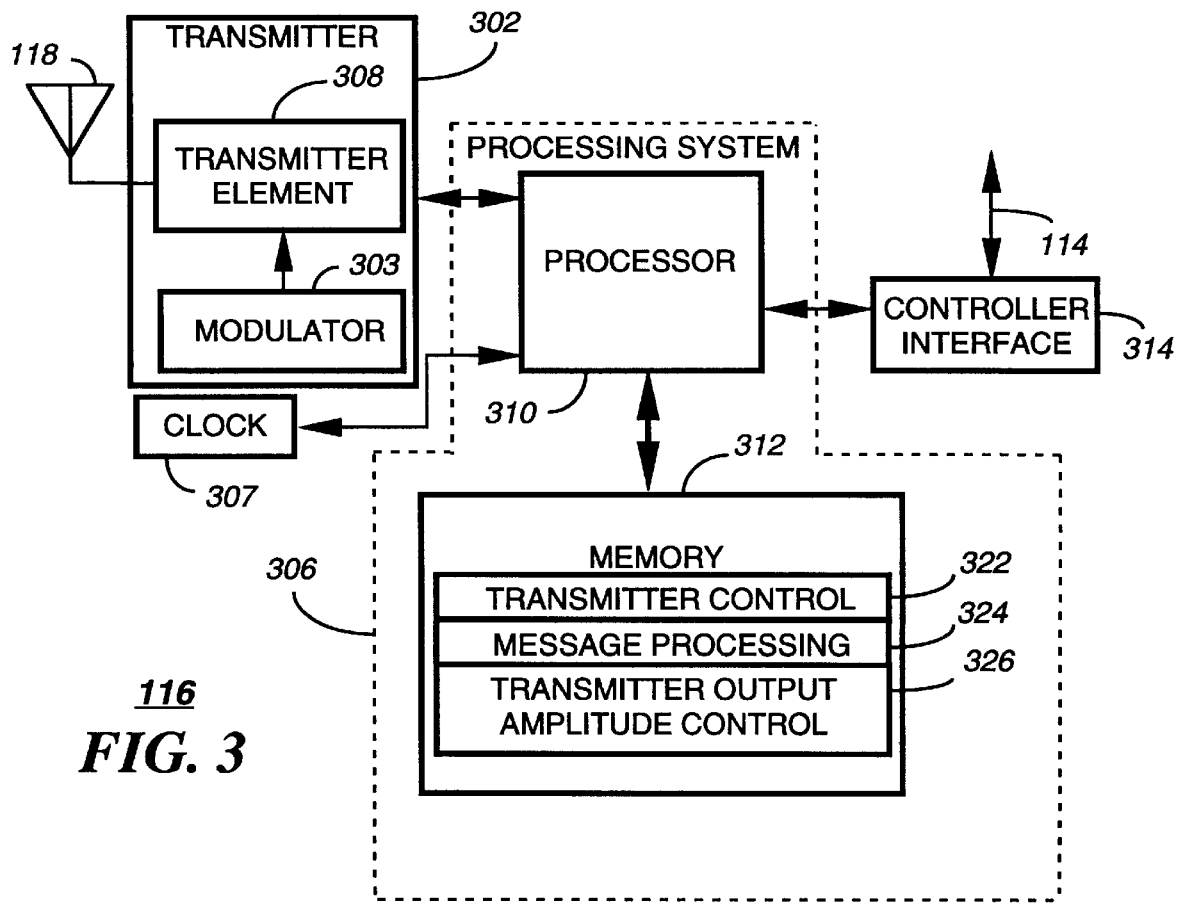
FIG. 3 is an electrical block diagram of an exemplary base station in accordance with the present invention.

FIG. 3 is an electrical block diagram of an exemplary base station 116 in accordance with the present invention. The base station 116 comprises the antenna 118 for radiating a signal comprising a message. The antenna 118 is coupled to a transmitter 302 for transmitting the message. The transmitter 302 preferably comprises a conventional frequency shift keyed (FSK) transmitter element 308 for transmitting a first simulcast signal sent simultaneously with at least a second simulcast signal from another transmitter 302 (as coordinated by the controller 112 through well-known techniques). It will be appreciated that, alternatively, other types of transmitter elements for demodulating other types of modulated signals can be utilized as well for the transmitter element 308. The transmitter 302 further comprises a conventional amplitude modulator 303 coupled to the transmitter element 308 for changing an output amplitude of the transmitter 302 during a portion of the time period of the first simulcast signal, thereby altering the intersymbol interference at the receiver during the portion of the time period. The transmitter 302 is coupled to a processing system 306 for processing the message and for controlling the transmitter 302 in accordance with the present invention. A conventional controller interface 314 preferably is also coupled to the processing system 306 for interfacing with the controller 112 via the communication link 114 through well-known techniques. In addition, a conventional clock 307 is coupled to the processing system 306 for providing a timing signal thereto.

The processing system 306 comprises a conventional processor 310 and a conventional memory 312. The memory 312 comprises software elements and other variables for programming the processing system 306 in accordance with the present invention. The memory 312 includes a transmitter control element 322 for controlling the transmitter 302 through well-known techniques. In addition, the memory 312 includes a message processing element 324 for programming the processing system 306 to process the message in a conventional manner. The memory 312 further comprises a transmitter output amplitude control element 326 for cooperating with the modulator 303 to control the output amplitude of the transmitter 302 in accordance with the present invention, as described further below.

FIG. 4 is an exemplary timing diagram 400 depicting intersymbol interference in a prior art wireless communication system. The diagram 400 depicts amplitude versus time of a first signal 402 from a first simulcast transmitter and a second signal 404 from a second simulcast transmitter, the second signal 404 identical to, but delayed with respect to, the first signal 402. When the first and second signals 402, 404 are received by a receiver at nearly the same amplitudes, e.g., less than 4 dB of difference, the received signal 406 can comprise indeterminant areas 408 where the received bit cannot be decoded. When the indeterminant areas 408 occupy more than about 50% of the symbol period (corresponding to a differential delay of 25% of the symbol period), receiver sensitivity begins to be reduced slightly. When the indeterminant areas increase to 100% of the symbol period (corresponding to a differential delay of 50% of the symbol period), receiver sensitivity is reduced to zero.

FIG. 5 is an exemplary timing diagram 500 depicting reduced intersymbol interference in the wireless communication system in accordance with the present invention. The diagram 500 depicts amplitude versus time of a first signal 502 and a second signal 504. A "nominal" value of the amplitude of the first and second signals is represented by the dashed lines 510. Note that during a portion of the time period of the first and second signals 502, 504, the amplitude is changed above and/or below the nominal value, preferably by adjusting the output amplitude of the transmitter 302 by the modulator 303 under control of the processing system 306, in accordance with the present invention. When the nominal values of the first and second signals 502, 504 would be received by a receiver at nearly the same amplitudes, the advantageous effect of changing the output amplitudes of the first and second signals 504, 504 is demonstrated by the decoded signal 506. Note that the indeterminant areas 508 advantageously are reduced in number compared to the diagram 400. The reason for the reduced number of indeterminant areas 508 is that when the amplitudes of the first and second signals 502, 504 are different by more than about 4 dB, receiver "capture" causes one of the signals to dominate, and the intersymbol interference goes away.

FIG. 6 is an exemplary protocol diagram 600 in accordance with the present invention. This protocol is used by the controller 112 to communicate to the base station 116 how the transmitter 302 is to change its output amplitude during simulcast transmissions. The diagram 600 comprises a synchronization portion 602 for synchronizing the base station 116 with the communications of the controller 112, using well-known techniques. The diagram 600 further comprises a type indication 604 for indicating the message type, e.g., output amplitude control command. In addition, the diagram 600 includes a command 606 for controlling the output amplitude configuration of the base station transmitter 302. This protocol advantageously allows the base station 116 to be reconfigured from time to time with regard to how it changes the output amplitude of its transmissions in accordance with the present invention. As an alternative, the base station 116 can be pre-programmed, either in the field or during manufacture, with fixed instructions as to how the transmitter 302 should change its output amplitude during simulcast transmissions.

FIG. 7 is a flow diagram 700 depicting operation of the exemplary wireless communication system in accordance with the present invention. The diagram 700 preferably begins with the controller 112 communicating with the base station 116 to control 702 the transmitter 302 to change the output amplitude of its transmissions during a portion of the time period of each simulcast transmission. Simulations have shown that relatively small changes in the output amplitude, e.g. about ±0.5 dB, can produce a sizable, e.g., two to one, improvement in word error rate. Alternatively, the transmitter 302 can be arranged 704 during installation and setup, or during manufacture, to change the output amplitude during a portion of the time period of each simulcast transmission. However the transmitter 302 is programmed, the controller 112 then controls the base stations 116 to send a simulcast transmission. The transmitter 302 then performs 706 according to its programmed instructions for changing the output amplitude. Preferably, the transmitter 302 changes the output amplitude as a predetermined function of time, in synchronism with the symbols transmitted by the transmitter 302.

In one embodiment, the transmitter 302 is arranged such that the output amplitude of a central portion of each symbol does not change, while the output amplitude of non-central portions of the symbol do change. This technique exploits the fact that with normally encountered differential delay characteristics, intersymbol interference occurs primarily in the non-central portions of the symbols. In another embodiment, the transmitted signal comprises an error correcting code that can correct a predetermined number of errors in a code block, and the transmitter 302 changes the output amplitude according to a pseudorandom sequence having a predetermined number of states, e.g., two states, during a transmission of the code block. In this embodiment, it is preferred that the transmitters 302 in the wireless communication system utilize pseudorandom sequences that are offset from one another, so that different transmitters 302 do not adjust their output amplitudes identically at every step of the sequence. In yet another embodiment, the transmitter 302 is arranged to repeat a change to the output amplitude for a number of symbols, wherein the number of symbols is determined from an encoding characteristic employed by the wireless communication system, e.g., the length of an error correcting code block.

Regardless which embodiment in accordance with the present invention is used, an overall objective is to reduce errors due to intersymbol interference. When used with an error correcting code, the present invention often can reduce the number of received errors sufficiently to change an uncorrectable number of errors into a correctable number of errors, thereby advantageously salvaging a message which would otherwise have been corrupted.

Thus, it should be clear from the preceding disclosure that the present invention provides a method and apparatus that advantageously reduces errors caused by intersymbol interference during a simulcast transmission when two or more simulcast signals are received at similar amplitudes with different transmission delays. The method and apparatus operates without requiring a custom tuning adjustment during installation and system setup. Many modifications and variations of the present invention are possible in light of the above teachings. Thus, it is to be understood that, within the scope of the appended claims, the invention can be practiced other than as described herein above.

What is claimed is:

1. A method in a wireless communication system for reducing errors caused by intersymbol interference in at least two simulcast signals transmitted during a time period in which a plurality of symbols are transmitted, the at least two simulcast signals received at similar amplitudes when the at least two simulcast signals are transmitted at a nominal amplitude, and the at least two simulcast signals having different transmission delays with respect to one another, the method comprising the steps of:

transmitting the at least two simulcast signals from a corresponding at least two transmitters; and changing an output amplitude of at least one of the at least two transmitters during the time period, the output amplitude changed such that at least a central portion of some symbols is transmitted at an amplitude greater than the nominal amplitude, and at least a central portion of other symbols is transmitted at an amplitude less than the nominal amplitude, thereby altering the intersymbol interference during the time period.

2. The method of claim 1, wherein the changing step comprises the step of changing the output amplitude in synchronism with a symbol transmitted from the at least one of the at least two transmitters.

3. The method of claim 1, wherein the changing step comprises the step of changing the output amplitude as a predetermined function of time.

4. The method of claim 1,
wherein the changing step comprises the step of changing the output amplitude in synchronism with a symbol transmitted from the at least one of the at least two transmitters, such that the output amplitude of a central portion of the symbol does not change, while the output amplitude of non-central portions of the symbol do change.

5. The method of claim 1,
wherein the at least two simulcast signals comprise an error correcting code that can correct a predetermined number of errors in a code block, and
wherein the changing step comprises the step of changing the output amplitude according to a pseudorandom sequence having a predetermined number of states during a transmission of the code block.

6. The method of claim 1, wherein the changing step comprises the step of repeating a change to the output amplitude for a number of symbols, wherein the number of symbols is determined from an encoding characteristic employed by the wireless communication system.

7. A transmitter for operating with at least one other transmitter in a wireless communication system for reducing errors caused by intersymbol interference in at least two simulcast signals transmitted during a time period in which a plurality of symbols are transmitted, the at least two simulcast signals received by a receiver at similar amplitudes when the at least two simulcast signals are transmitted at a nominal amplitude, and the at least two simulcast signals having different transmission delays with respect to one another, the transmitter comprising:
   a transmitter element for transmitting a first simulcast signal sent simultaneously with at least a second simulcast signal from another transmitter; and
   a modulator coupled to the transmitter element for changing an output amplitude of the transmitter during the time period, the output amplitude changed such that at least a central portion of some symbols is transmitted at an amplitude greater than the nominal amplitude, and at least a central portion of other symbols is transmitted at an amplitude less than the nominal amplitude, thereby altering the intersymbol interference at the receiver during the time period.

8. The transmitter of claim 7, wherein the modulator is arranged to change the output amplitude in synchronism with a symbol transmitted from the transmitter.

9. The transmitter of claim 7, wherein the modulator is arranged to change the output amplitude as a predetermined function of time.

10. The transmitter of claim 7,
wherein the modulator is arranged to change the output amplitude in synchronism with a symbol transmitted from the transmitter, such that the output amplitude of a central portion of the symbol does not change, while the output amplitude of non-central portions of the symbol do change.

11. The transmitter of claim 7,
wherein the first simulcast signal comprises an error correcting code that can correct a predetermined number of errors in a code block, and
wherein the modulator is arranged to change the output amplitude according to a pseudorandom sequence having a predetermined number of states during a transmission of the code block.

12. The transmitter of claim 7, wherein the modulator is arranged to repeat a change to the output amplitude for a number of symbols, wherein the number of symbols is determined from an encoding characteristic employed by the wireless communication system.

13. A controller in a wireless communication system for reducing errors caused by intersymbol interference in at least two simulcast signals transmitted during a time period in which a plurality of symbols are transmitted, the at least two simulcast signals received at similar amplitudes when the at least two simulcast signals are transmitted at the nominal amplitude, and the at least two simulcast signals having different transmission delays with respect to one another, the controller comprising:
   a network interface for receiving a message from a message originator;
   a processing system coupled to the network interface for processing the message; and
   a base station interface coupled to the processing system for controlling a transmitter to transmit one of the at least two simulcast signals,
   wherein the processing system is programmed to control the transmitter to change an output amplitude of the transmitter during the time period, the output amplitude changed such that at least a central portion of some symbols is transmitted at an amplitude greater than the nominal amplitude, and at least a central portion of other symbols is transmitted at an amplitude less than the nominal amplitude, thereby altering the intersymbol interference during the time period.

14. The controller of claim 13, wherein the processing system is programmed to control the transmitter to change the output amplitude in synchronism with a symbol transmitted from the transmitter.

15. The controller of claim 13, wherein the processing system is programmed to control the transmitter to change the output amplitude as a predetermined function of time.

16. The controller of claim 13,
wherein the processing system is programmed to control the transmitter to change the output amplitude in synchronism with a symbol transmitted from the transmitter, such that the output amplitude of a central portion of the symbol does not change, while the output amplitude of non-central portions of the symbol do change.

17. The controller of claim 13,
wherein the at least two simulcast signals comprise an error correcting code that can correct a predetermined number of errors in a code block, and
wherein the processing system is programmed to control the transmitter to change the output amplitude according to a pseudorandom sequence having a predetermined number of states during a transmission of the code block.

18. The controller of claim 13, wherein the processing system is programmed to control the transmitter to repeat a change to the output amplitude for a number of symbols, wherein the number of symbols is determined from an encoding characteristic employed by the wireless communication system.

* * * * *